United States Patent [19]

Evett

[11] 4,100,820

[45] Jul. 18, 1978

[54] SHIFT LEVER AND INTEGRAL HANDBRAKE APPARATUS

[76] Inventor: Joel Evett, 287 Washington St., Newton, Mass. 02158

[21] Appl. No.: 722,685

[22] Filed: Sep. 13, 1976

[51] Int. Cl.² .................. G05G 1/24; G05G 5/16; F16D 67/00
[52] U.S. Cl. .................... 74/489; 74/531; 192/4 R
[58] Field of Search ............... 192/4 R, 4 A; 74/488, 74/489, 531

[56] References Cited

U.S. PATENT DOCUMENTS

| | | | |
|---|---|---|---|
| 3,478,617 | 11/1969 | Maeda | 74/489 |
| 3,534,629 | 10/1970 | Schwerdhofer | 74/489 X |
| 3,554,156 | 1/1971 | Kishida et al. | 192/4 R |
| 3,554,158 | 1/1971 | Shimano | 74/489 X |
| 3,595,351 | 7/1971 | Ishida | 192/4 R |

FOREIGN PATENT DOCUMENTS

| | | | |
|---|---|---|---|
| 921,292 | 1/1947 | France | 74/489 |
| 1,067,196 | 1/1954 | France | 74/489 |
| 17,296 of | 1910 | United Kingdom | 74/489 |

*Primary Examiner*—Allan D. Herrmann

[57] ABSTRACT

A shift assembly and integral handbrake apparatus particularly for bicycles is comprised of a pivotal shift lever and a pivotal handbrake lever. Both levers are carried on a handbrake housing. A Bowden cable is coupled to the shift lever. Friction means places a preset and controlled drag on the shift lever. Pivoting the shift lever provides the mechanical advantage necessary to overcome the drag placed thereon thereby to effect a relative lengthening or shortening of the Bowden cable. The shift lever and handbrake lever are positioned on the housing in such manner as to allow nearly simultaneous grip of both levers.

12 Claims, 20 Drawing Figures

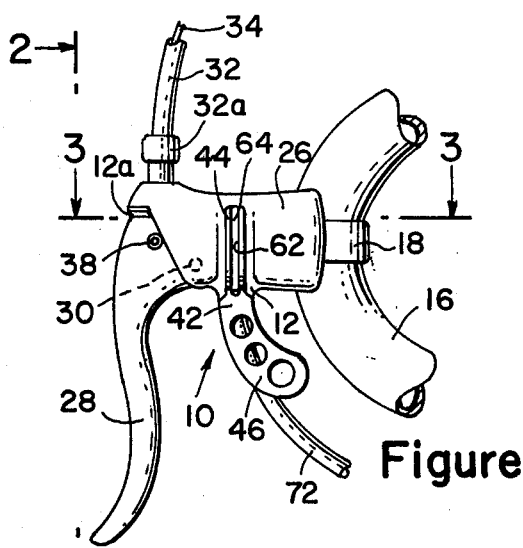
Figure 1
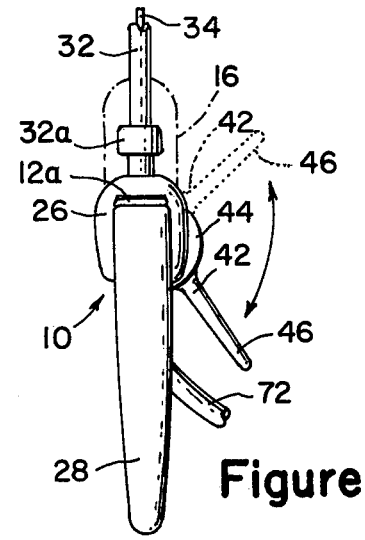
Figure 2
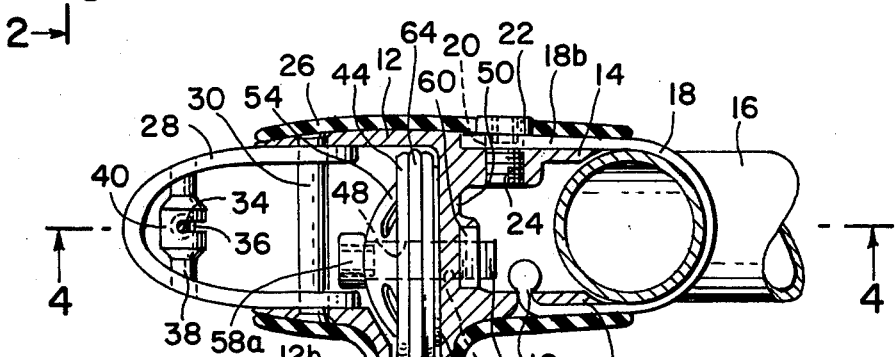
Figure 3
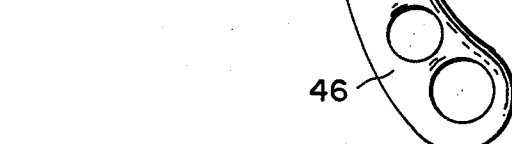
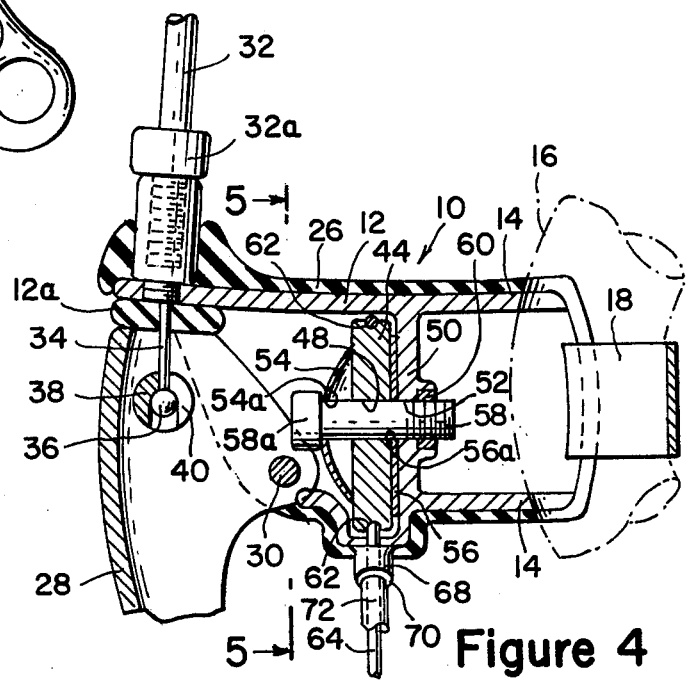
Figure 5
Figure 4

SHIFT LEVER AND INTEGRAL HANDBRAKE APPARATUS

This invention relates to a shift assembly for bicycles and, more particularly, the invention relates to a shift mechanism that is structually integrated with a handbrake assembly.

Most "English Racer" or speed bicycles are equipped with handbrake systems that employ Bowden cables. These handbrake assemblies are bolted or strapped to the handlebar. In prior constructions, the shift lever or shift apparatus found on these speed bicycles is supplied as a discrete unit that is separate from the handbrake assembly. The discrete shift device is then either attached to the handlebar or it is attached to some other part of the bicycle. Because many of these bicycles have unusual handlebar constructions, the rider is caused to assume a low profile as he grips the handlebars. With such handlebar constructions and with the shift apparatus attached to the bicycle as a discrete device, the rider must effect a considerable "reach" for the shift lever particularly if the lever is located on the down-tube of the bicycle. Even when the shift apparatus is moved to the handlebar, the silhouette or racing posture assumed by the operator makes the move for the shift lever a considerable task. Not only is the reach or move for this lever a time-consuming and distracting chore, but also such arm movement may cause the rider to break cadence unintentionally, or to increase his drag profile unavoidably. And, worse still, the reach for the shift lever associated with conventional systems may produce bicycle instability or loss of control if done over rough terrain.

In general, the present invention overcomes the above-noted problems by integrating or making a structural unit of the shift and handbrake assemblies. The integrated assembly comprises a handbrake support bracket upon which pivots a handbrake lever and a gear shift lever. The handbrake lever controls a conventionl Bowden brake cable. One end of the gear shift lever is formed, preferably, as a shift barrel. The other end of the shift lever flares to form a handle or finger paddle. The shift barrel is rotatably mounted and carried by the handbrake support bracket. The mounting is such that the finger paddle extends from the support bracket. One end of a Bowden cable is coupled to the shift lever or shift barrel. The other end of this cable is attached to the bicycle transmission. A friction assembly is constructed to place a preset and controlled drag on the shift barrel to prevent movement of same until manual pressure moves the finger paddle. Movement of the finger paddle produces rotation of the shift barrel. Rotation of this last-mentioned element effects a relative lengthening or shortening of the Bowden shift cable resulting in a gear change. Because the shift lever is proximate to the handbrake lever, nearly simultaneous grasp of both levers is possible. The considerable arm movement associated with prior arrangements is eliminated.

It is therefore an object of the present invention to provide a shift lever and handbrake assembly constructed as an integral unit.

It is another object of the present invention to provide a shift apparatus that is constructed as an integral part of the handbrake assembly with the construction being such as to afford precise control of a Bowden shift cable.

It is a further object of the present invention to provide an integrated shift lever and handbrake assembly wherein a controlled drag is placed on the shift lever to hold same stationary until moved by manual pressure.

It is a still further object of the present invention to provide an integral shift apparatus and handbrake unit wherein the shift apparatus is of simplified construction and operates to provide the mechanical advantage necessary for precise control of a Bowden shift cable.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appended claims.

In the drawings, wherein the same reference numeral denotes the same element throughout the several views:

FIG. 1 is a front view of one embodiment of the present invention, the integral shift lever and handbrake assembly is shown attached to a handlebar;

FIG. 2 is a view taken along line 2—2 of FIG. 1;

FIG. 3 is a sectional view drawn on an enlarged scale and taken along line 3—3 of FIG. 1 to reveal in detail the structure of the integrated assembly;

FIG. 4 is a sectional view taken along line 4—4 of FIG. 3;

FIG. 5 is a sectional view taken along line 5—5 of FIG. 4;

Figure 6:
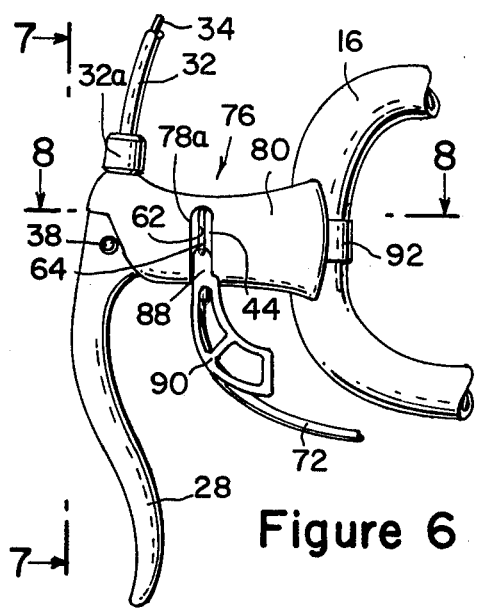
FIG. 6 is a front view of another embodiment of the present invention showing the integrated apparatus attached to the handlebar.
Figure 7:
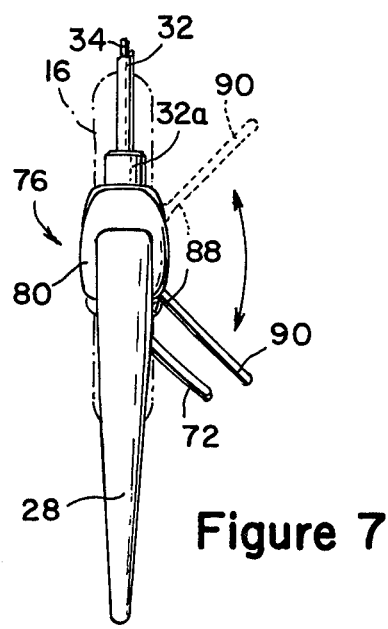
FIG. 7 is a view taken along line 7—7 of FIG. 6.

More particularly now and referring to the drawings, FIGS. 1 through 5 illustrate one embodiment of the present invention. The integrated shift lever and handbrake assembly is generally indicated by reference numeral 10 and it includes a handbrake support bracket or housing 12. One portion of bracket 12 is formed as a seat 14 to accommodate the periphery of a handlebar 16. The seat and hence assembly 10 is demountably affixed to handlebar 16 by means of a metallic strap 18. As can best be seen in FIG. 3, strap 18 has one end 18a secured to one side of housing 12. The other end of the strap, end 18b, is guided to the opposed outboard face of bracket 12 in such manner as to wrap partways around handlebar 16. Strap end 18b is formed with an aperture 20 sized to receive a stud 22. Stud 22 is threadably received in a tapped aperture 24 whereby threading stud 22 into aperture 24 tensions strap 18 causing same to lock assembly 10 firmly to handlebar 16. Preferably, bracket 12 is covered by a suitable resilient material 26 comprised of soft rubber or some such synthetic.

As is common in the art, the outboard side of support bracket 12 is designed to carry a handbrake lever 28 with the lever pivoting relative to bracket 12 by means of a pivot pin 30. A resilient pad 12a acting as a stop for lever 28 is appropriately aligned and attached to housing support 12 as shown. A conventional Bowden cable system is employed with brake lever 28. This Bowden cable system includes an outer sheath or jacket 32 one end of which is threadably secured to bracket 12 by means of a jacket cap 32a. A brake cable or wire 34 is strung through jacket 32 in such manner as to move therein and relative thereto. As seen in FIG. 4, one end of brake cable 34 is formed with a coupling means 36. A pin 38 is received in handbrake lever 28. Pin 38 is formed with an enlarged central region 40 designed to receive coupling means 36. Thus, when brake lever 28 is caused to pivot relative to bracket 12, brake cable 34 is lengthened or shortened relative to cable sheath 32. This action results in brake operation.

A gear shift lever 42 has one end formed as a shift barrel or shift disc 44 the faces of which are, preferably, planar. The other end of shift lever 42 flares to form a handle or flattened finger paddle 46. An aperture 48 is disposed through the width or along the longitudinal axis of shift barrel 44 in such manner as to communicate between the two planar faces of the barrel. It will be noticed, and now reference is made to FIGS. 3, 4, and 5, that bracket or housing 12 is integrally formed with a support partition 50 having an essentially planar face and through which passes an aperture 52. Shift lever 42, or more particularly, shift barrel 44, mounts adjacent to the planar face of support partition 50 in a way that will be described shortly. Housing 12 is further defined by a window or slot 12b formed contiguous to the planar face of partition 50 and in suitable alignment therewith. As seen in FIG. 5, slot 12b provides a pivot window in which moves or commutates a portion of shift lever 42 during operation of the apparatus as will be described below.

Means for placing a controlled drag on shift barrel 44 comprises a domed and preferably slotted compression washer 54 that is sized somewhat smaller than the radial or circular cross-section of barrel 44. Similarly, a pivot washer or spacer 56 is sized complementary to, albeit somewhat smaller than, the circular cross-section of barrel 44. Pivot spacer 56 and compression washer 54 each have respective centrally disposed stud receiving apertures 56a and 54a. As seen in detail in FIGS. 3 and 4, barrel 44 is mounted on support partition 50 by means of a threaded stud 58 that has a head 58a. In a manner that will be described in detail shortly, stud 58 is threaded into a nut 60 that is press-fit and aligned concentrically in the walls of aperture 52. Barrel 44 is mounted in housing 12 by positioning or interfacing spacer 56 between one planar free of barrel 44 and the planar face of support partition 50. Domed compression washer 54 is placed on stud 58 to be constrained thereon by reacting against cap 58a. The stud is directed to be received through aperture 48 of barrel 44 and then directed through the aperture formed in spacer 56. Stud 58 is then caused to align in bore 52 eventually to be threadably received in nut 60. With this construction barrel 44 is mounted for controlled rotation within housing bracket 12 with stud 58 providing a pivot axis for shift barrel 44. This mounting places a portion of lever 42 in slot 12b thereby to orient paddle 46 clear of housing 12 yet depending therefrom. It will be noticed, too, that stud 58 also acts as a common axis for washer 54 and spacer 56.

An annular groove 62 is formed on the rim of barrel 44. A Bowden cable is used in conjunction with the shift apparatus and it comprises a Bowden shift cable 64 that is directed to engage and wrap partways around annular groove 62. As seen in FIG. 5, one end of shift cable 64 is formed with an enlargement or key 66 designed to secure this cable end to shift lever 42. A cable guide or portal 68 is appropriately aligned relative to groove 62 so as to receive and direct cable 64 through housing 12 as the cable proceeds off the rim groove. Guide 68 includes a seat 70 against which abuts one end of a Bowden cable sheath 72. Bowden shift cable 64 moves in and relative to sheath 72 during operation of the assembly as will be described now.

In operation of the embodiment shown in FIGS. 1 through 5 and to control the drag or loading placed on shift barrel 44, stud 58 is threaded or tightened into nut 60. More particularly, the threading or turning of stud 58 into nut 60 compresses domed washer 54 against the confronting planar face of shift barrel 44. The other face of barrel 44 is caused to react against washer 56 with this last-mentioned element compressed between shift barrel 44 and the confronting planar face of partition 50. The drag or loading placed on the shift barrel is proportional to the axial displacement or travel of stud 58 relative to and in partition wall 50. When a gear change is desired, the rider manually pivots paddle 46. Rotative displacement of paddle 46 and lever 42 provide the mechanical advantage necessary to overcome the drag placed on shift barrel 44. Consequently, the shift barrel pivots in response to manual pressure on the finger paddle. This action effects a relative displacement or relative lengthening or shortening of Bowden cable 64 with respect to sheath 72. The other end of cable 64, this other end not shown, is, of course, coupled to the vehicle or bicycle transmission. Such lengthening or shortening of cable 64 operates to shift gears. It will be apparent that the frictional loading placed shift barrel 44 is sufficient to keep same stationary and thereby prevent the transmission from moving out of gear. However, this loading is not so great as to withstand the rotational torque developed by appropriate manual pressure on finger paddle or handle 46.

In event that wear or abrasion effects an easing of the drag operating on shift barrel 44, stud 58 is readily accessible allowing it to be retightened. The stud can be retightened by appropriate means such as an Allen socket 74 in stud head 58a.

Turning now to FIGS. 6 through 10, there is shown another embodiment of the present invention somewhat similar to the embodiment discussed previously. The shift lever and integrated handbrake assembly is indicated generally by reference numeral 76 and it is shown attached to handlebar 16. Assembly 76 is comprised of a handbrake support bracket or housing 78. It is preferred that housing 78 be covered by a suitable resilient material 80. One portion of bracket 78 is formed with a seat or enlargement 82 to accommodate a peripheral region of handlebar 16. Seat 82 is driven into firm engagement with handlebar 16 in a manner that will be described below. The outboard end of bracket 78 carries a conventional brake lever 28 and Bowden cable assembly that is similar to the corresponding lever and cable assembly described fully in the previous embodiment.

Housing or bracket 78 is formed with a support partition 84 that has a planar face disposed in confronting alignment with handlebar 16. The bracket is further defined by a bracket window or slot 78a formed contiguous to partition 84 and in suitable alignment therewith. An aperture 86 is formed through support partition 84 as shown.

The shift apparatus comprises a shift lever 88 that closely resembles shift lever 42 discussed above. One end of lever 88 is formed as a shift barrel 44. The rim of barrel 44 is formed with an annular groove 62. Shift barrel 44 is formed with a central bore or aperture 48 communicating between the barrel faces. The other end of shift lever 88 flares to form a flattened finger paddle or handle 90.

A Bowden cable system is used in conjunction with shift lever 88, and as is common with such Bowden systems, the system includes cable 64 which moves in and relative to a cable sheath 72. One end of cable 64 wraps partways around rim groove 62 as noted earlier. This last-mentioned cable end locks on lever 88 by means of a key 66. A cable guide or housing portal 78b is appropriately aligned relative to groove 62 thereby to receive and guide cable 64 through housing 78 as the cable proceeds off rim groove 62. Guide 78b includes a seat against which abuts and attaches a sheath cap 72a as shown.

A mounting strap 92 is designed to wrap partways around handlebar 16. That portion of strap 92 which is spaced from the handlebar and disposed inwardly of housing 78 is formed with a planar shelf 92a. An aperture 94 is disposed through the shelf. A threaded nut 96 is placed in axial alignment with aperture 94. Nut 96 is, preferably, tack-welded to that face of shelf 92a that confronts handlebar 16.

Figure 8:
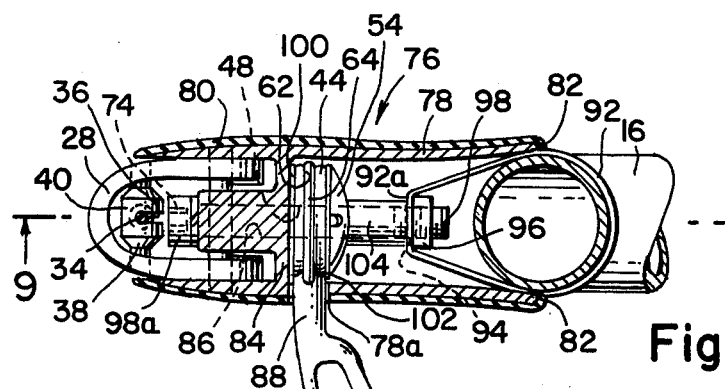
FIG. 8 is an enlarged sectional view taken on line 8—8 of FIG. 6 to reveal in detail the structure of the integrated apparatus.
Figure 10:
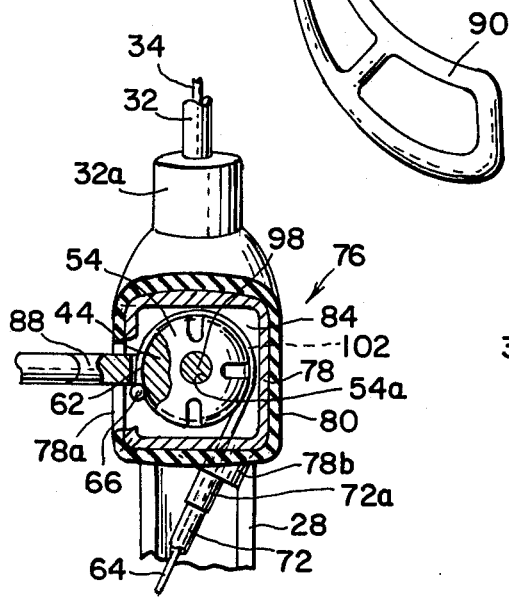
FIG. 10 is a view taken on line 10—10 of FIG. 9.
Figure 9:
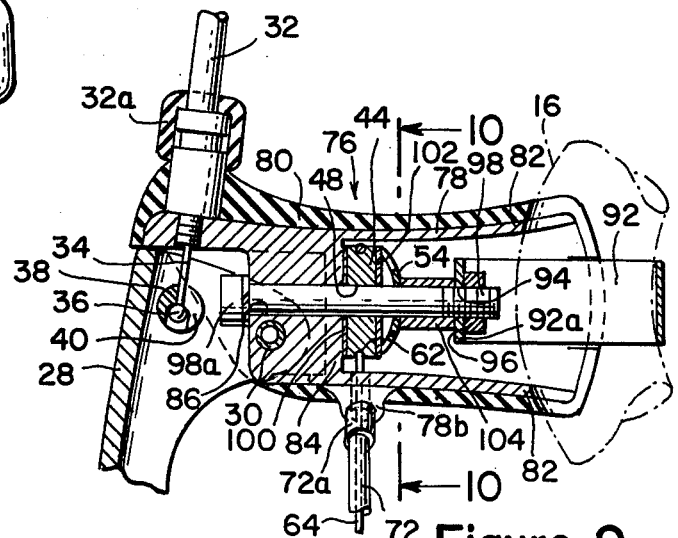
FIG. 9 is a sectional view taken on line 9—9 of FIG. 8.
Figure 11:
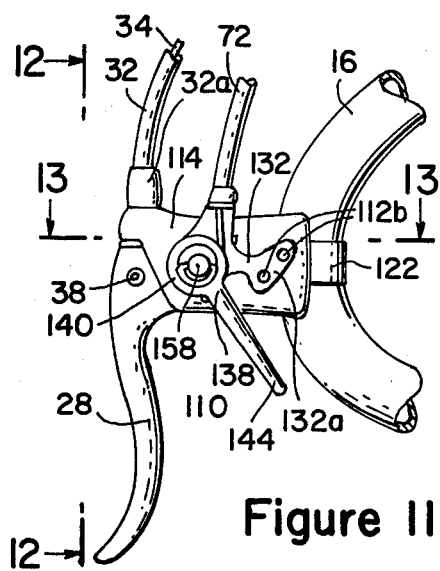
FIG. 11 is a front view of a further embodiment according to the present invention showing the integrated assembly attached to the handlebar.
Figure 12:
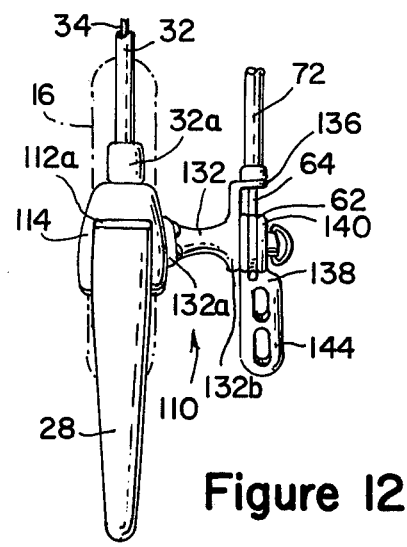
FIG. 12 is a view taken along line 12—12 of FIG. 11 showing the shift apparatus attached to, yet spaced from, the handbrake assembly.

Means for placing a controlled drag on shift barrel 44 includes a threaded stud 98 having a cap or head 98a. The stud is directed into housing 78 from the outboard side thereof to be received in aperture 86 of partition wall 84. As best seen in FIGS. 8 and 9, shift barrel 44 is mounted on stud 98 such that the barrel is interposed between a pair of apertured pivot washers 100 and 102. Barrel 44 mounts adjacent to wall partition 84 in a way that places part of lever 88 in slot 78a thereby to orient paddle 90 out of, yet depending from, housing 78.

A domed and, preferably, slotted compression washer 54, similar to the compression washer shown in FIGS. 1 through 5, is mounted on stud 98 and placed in confronting alignment with the inboard face of barrel 44. A suitably dimensioned sleeve 104 is placed on stud 98 to be carried thereon in axial alignment therewith. The sleeve is caused to react against compression washer 54 during operation of this embodiment as will be described now.

In operation, stud 98 is threaded and tightened into nut 96. The sleeve reacts against domed washer 54 causing same compressingly to engage the load shift barrel 44 to provide a frictional drag thereon. The tightening of stud 98 into nut 96 not only compressively loads barrel 44 but it also operates to cause nut 96 to react against or on strap 92. This last-mentioned reaction operates to tension the strap and thereby pull bracket 78 firmly against handlebar 16, or more particularly, mount seat 82 securely onto handlebar 16. As was mentioned with reference to the earlier described embodiment, the amount of drag placed on barrel 44 operates to hold same stationary. The drag or loading on the barrel as well as the tension placed on strap 92 is controlled by the degree to which stud 98 is relatively tightened into nut 96. When the proper amount of drag is placed on barrel 44 and hence lever 88, manually pushing on paddle 90 effects the mechanical advantage necessary to overcome this drag. Shift barrel 44 is then displaced pivotally in response to rotative movement of paddle 90. Rotation of the shift barrel effects movement of cable 64 in and relative to sheath 72. As noted previously, this lengthening or shortening of cable 64 operates to shift the gears in the vehicle transmission. In event that the compressive load on stud 98 needs readjustment this is easily accomplished by such means as an Allen socket 74 in stud cap 98a.

Figure 13:
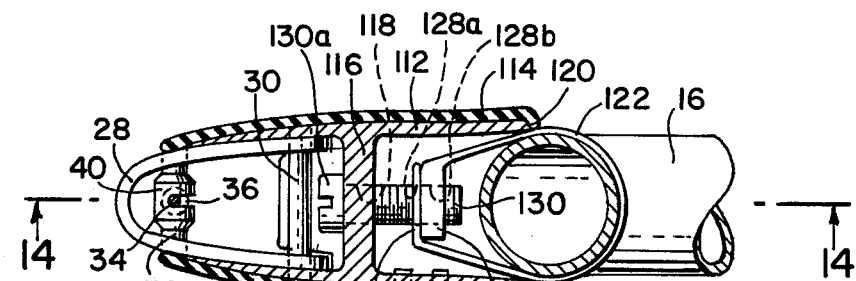
FIG. 13 is a sectional view drawn on an enlarged scale and taken along line 13—13 of FIG. 11 to reveal in detail the structure of the integrated assembly.
Figure 14:
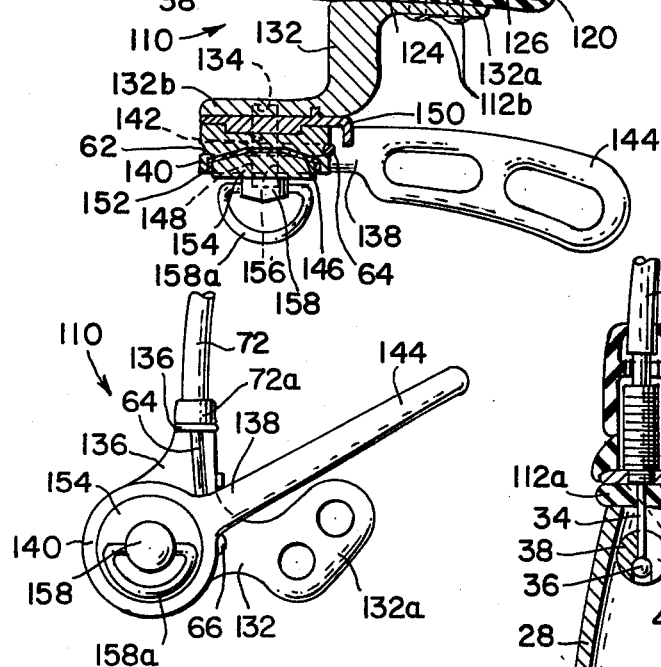
FIG. 14 is a sectional view taken along line 14—14 of FIG. 13, for purposes of clarity the shift assembly is seen in plan view and it is seen separated from the handbrake assembly to which it is normally attached.
Figure 14:
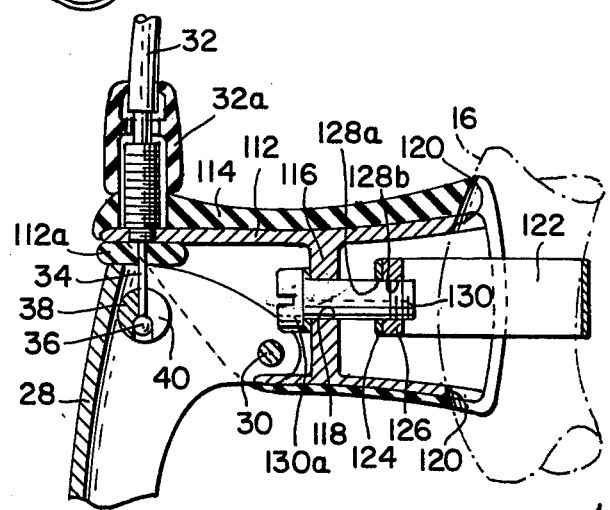

Turning now to FIGS. 11 through 14 there is shown a further embodiment of the present invention. The shift apparatus and integrated handbrake assembly is indicated generally by reference numeral 110 and it is shown attached to handlebar 16. Comparing FIG. 11 with FIG. 13 it will be seen that integrated assembly 110 is comprised of a conventional handbrake apparatus to which is attached a shift device with the latter spaced from, albeit joined to, the former. More particularly, the handbrake apparatus comprises a support housing 112 preferably covered by a suitable resilient material 114. As seen in FIGS. 13 and 14 the housing is formed with a wall 116 in which is drilled an aperture 118. In a manner that is similar to the above-mentioned embodiments, housing 112 carries a handbrake lever 28 pivoting on pin 30. As is common with such apparatus, a resilient pad or cushion 112a is appropriately aligned on housing 112 to act as a cushion and stop for brake lever 28. Brake lever 28 controls a Bowden cable system comprising a cable sheath 32 in which moves a brake cable 34. The associated elements used for controlling and connecting brake cable 34 to brake lever 28 are essentially identical to earlier described elements so they need not be further discussed here.

Handbrake housing 112 is attached to handlebar 16 along a mounting seat 120 in accordance with the following construction. A mounting strap 122 is designed to wrap partways around the periphery of handlebar 16 and, with attention directed to FIG. 14, it will be seen that the strap has two ends, 124 and 126, each of which is formed with a respective stud receiving bore 128a and 128b. It will be observed that strap end 126 is formed with a relatively enlarged or thickened portion allowing its associated bore 128b to be tapped. A threaded stud 130 formed with a head 130a is received through wall aperture 118 to be directed through strap bore 128b. It will then be apparent that tightening on stud 130 causes stud head 130a to react against wall 116 as the leading portion of stud 130 threadably engages and reacts on strap aperture 128b. Thus, the tightening of bolt 130 in threaded aperture 128b tensions both strap 122 and bolt 130 thereby to drive housing seat 120 firmly against handlebar 16.

The shift assembly is mounted on housing 112 by means of a mounting bracket or housing extension 132. One end of extension 132 is formed as a mounting pad 132a. The other end of this extension is formed as a shift barrel mounting shelf 132b. Shelf 132b contains an aperture 134 and a cable mounting projection or finger 136 as shown. Pad 132a is mounted on housing or handbrake bracket 112 by means of housing rivets 112b.

A shift lever 138 has one end formed as a shift barrel 140. Preferably, shift barrel 140 is defined by two faces and an axially aligned mounting aperture 142 communicating between these two faces. The other end of shift lever 138 flares to form a flattened finger paddle or handle 144. One face of shift barrel 140 is formed with a conically configured countersunk portion 146. The other face of barrel 140 is substantially planar. A threaded tensioning stud 148 is press-fit or otherwise affixed in shelf 132b such that stud 148 extends from one face of the shelf as shown. An essentially planar or flat pivot washer 150 is placed on stud or axle 148. Shift lever 138, or more particularly, shift barrel 140 is then mounted on stud 148 by placing barrel aperture 142 on this stud. Shift barrel 140 is mounted in such manner as to interpose flat washer 150 between confronting faces of the barrel and the shelf. A conically formed washer 152 is sized complementary to barrel depression or countersunk portion 146. A pressure plate 154 having a central aperture 156 has one face conically configured and formed complementary to washer 152. Conical washer 152 is placed on stud 148. Pressure plate 154 is then received and placed on stud 148 by means of a pressure plate aperture 156. A threaded cap 158 having a folding handle 158a is threaded onto stud 148 to bias pressure plate 154 during operation of this embodiment as will be described shortly.

Similar to the foregoing embodiments, an annular groove 62 is formed on the rim of shift barrel 140. As described earlier, a Bowden cable assembly is used in conjunction with shift lever 138. The Bowden cable system includes a shift cable 64 locked to lever 138 by means of a key 66. A cable sheath 72 is attached to shelf mounting finger 136 by means of coupling cap 72a, with shift cable 64 passing through and guided by finger 136 as shown. The other end of shift cable 64, this end not shown, is coupled to the vehicle or bicycle transmission.

In operation, and to set the controlled drag on shift barrel 140, cap 158 is tightened on stud 148 by turning handle 158a. It will be readily apparent that such tightening drives pressure plate 154 and conical washer 152 into a pressured engagement with complementary barrel depression 146. The barrel is then driven into engagement with one face of pivot washer 150 while the other face of washer 150 reacts against shelf 132b. This loads the shift barrel between pivot washer 150 on the one side and conical washer 152 on the other. The degree of loading and hence the frictional drag placed on the barrel is directly proportional to the tightening of cap 158 on stud 148. The drag placed on barrel 140 is sufficient to hold same stationary and prevent the vehicle transmission from moving out of gear. To shift gears the rider applies finger pressure on paddle or handle 144. The paddle and lever operate to provide the mechanical advantage necessary to overcome the frictional drag placed on shift barrel 140. Rotative movement of handle 144 effects rotative movement of shift barrel 140. Rotation of the barrel produces a lengthening or shortening of shift cable 64 relative to cable sheath 72 thereby to effect the gear change.

It is to be understood that by suitable rearrangement of the illustrated elements the shift apparatus can be attached to either side of bracket housing 112 with shift lever 138, or more particularly finger paddle 144 either orientated towards the bicycle wheel or away from it. It is preferable, however, to mount extension or support 132 in such manner and on such side of housing 112 as to place lever 138 in confronting alignment with the rider.

Figure 15:
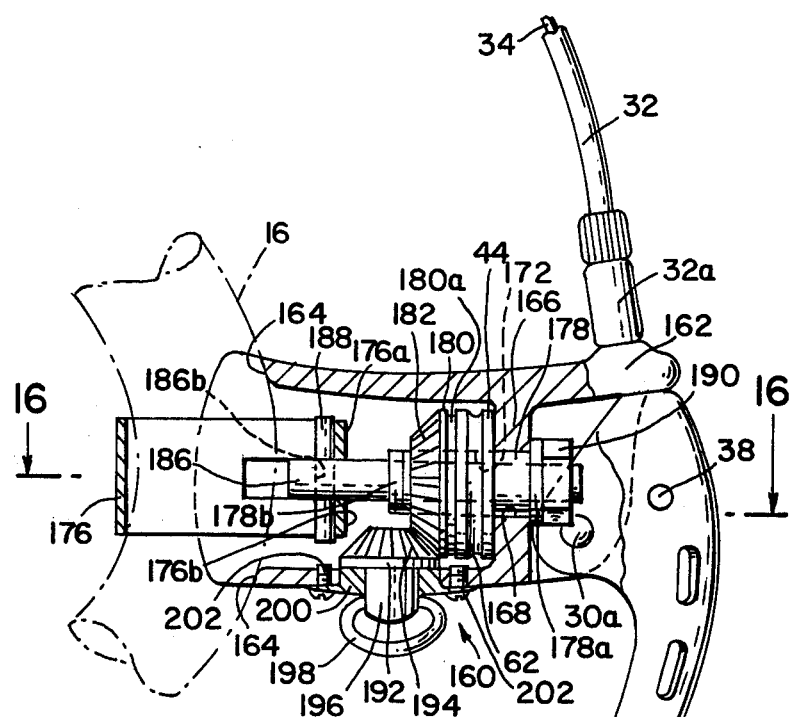
FIG. 15 is a plan view of yet another embodiment of the present invention, parts of which are shown in section with the integrated device seen attached to the handlebar.
Figure 16:
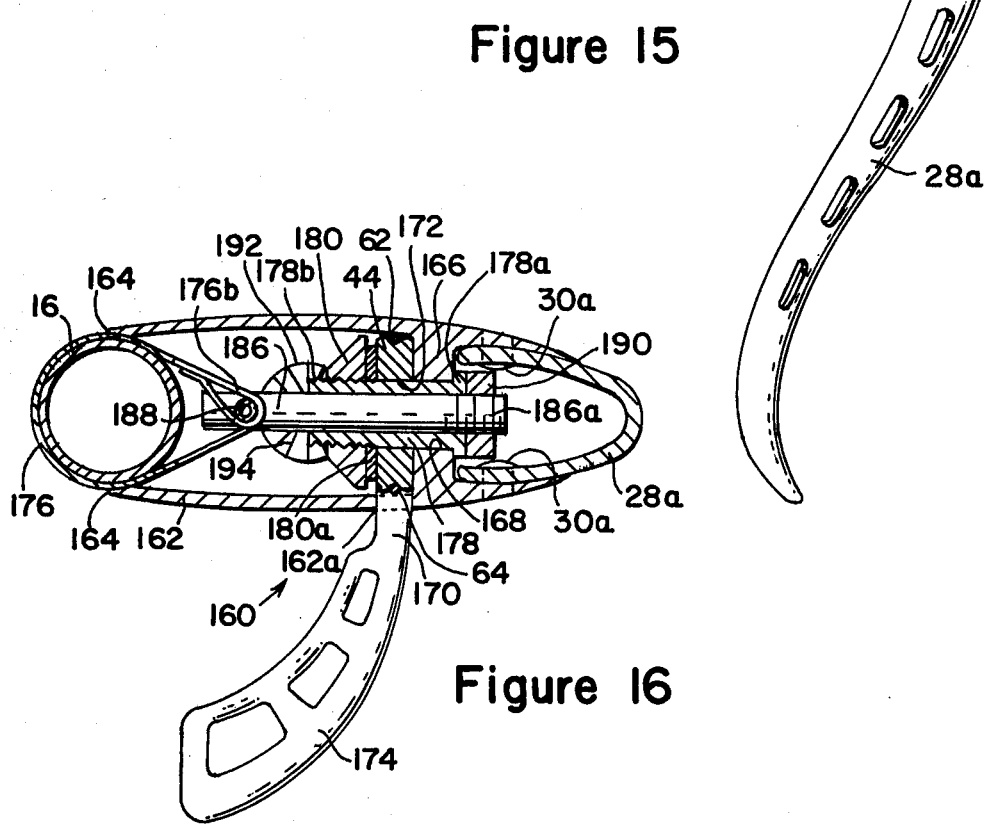
FIG. 16 is a sectional view taken substantially along line 16—16 of FIG. 15 with some parts in elevation for clarity.

Turning now to FIGS. 15 and 16 there is shown yet another embodiment of the present invention. The shift apparatus and integrated handbrake assembly is indicated generally by reference numeral 160 and it is shown mounted on handlebar 16. Assembly 160 is comprised of a handbrake support bracket 162 the outboard end or region of which carries a handbrake lever 28a. Lever 28a and its attendant structure are essentially similar to that described with reference to the foregoing embodiments except that lever 28a now pivots on a pair of rivets 30a instead of on pivot pin 30 of earlier described embodiments. Bracket or housing 162 is formed with a handlebar mounting lip or seat 164 adapted to receive a peripheral portion of handlebar 16 when the handlebar is caused to mount firmly in seat 164 in a way that will be described shortly.

Housing or bracket 162 is formed with a support partition 166 through which is formed an aperture 168. Partition 166 has a planar face disposed in opposing alignment with handlebar 16. Bracket 162 is further defined by a window or slot 162a formed contiguous to partition 166 and suitably aligned therewith.

The shift apparatus comprises a shift lever 170 that is not unlike the earlier described shift levers. Lever 170 has one end formed as a shift barrel 44. Shift barrel 44 is defined by two substantially planar faces and a relatively large pivot aperture 172 communicating between these two faces. Barrel 44 is also formed with a rim groove 62 adapted to receive one end of a Bowden shift cable, that, for purposes of clarity, is not shown. The other end of shift lever 170 flares to form a flattened finger paddle or handle 174.

A mounting strap 176 has its two longitudinal ends formed with an appropriate loop construction 176a and 176b. The strap is directed partways around the periphery of handlebar 16 in such manner as to place loop 176a and loop 176b inwardly of housing 162. A hollow sleeve 178 has one end formed as an enlarged flange 178a. The other end of sleeve 178 is formed with external threads 178b. Sleeve 178 is placed in aperture 168 with flange end 178a bearing against that region of partition 166 that defines aperture 168. Shift barrel 44 is mounted on sleeve 178 thereby to place the barrel contiguous to the inboard and planar face of partition 166.

Means for placing a controlled drag on shift lever 170, or more particularly, place a drag on shift barrel 44 comprises a conical loading washer or loading disc 180 defined by an interface platform 180a. The conical region of loading disc 180 is fabricated with external gear teeth 182. Further, loading disc 180 is formed with a threaded aperture 184 preferably disposed through its central longitudinal axis. Threaded aperture 184 is sized complementary to sleeve threads 178b thereby to allow loading disc 180 to be threadably carried on sleeve 178 as shown.

A mounting bolt 186 has a threaded end 186a. The other end of bolt 186 is formed with a bore 186b that is disposed transverse to the longitudinal axis of the bolt. A pin 188 is carried in bore 186b in a manner that captures strap loops 176a and 176b. Bolt 186 is inserted into sleeve 178. The bolt is sized to that threaded end 186a thereof extends minutely out of sleeve flange 178a as shown. A tensioning nut 190 is threaded onto exposed bolt end 186a. Nut 190 is then tightened against the exposed and outboard face of flange 178a. This tensions both bolt 186 and strap 176 thereby to drive housing seat 164 firmly against handlebar 16.

A conical driving cone or driving means 192 carries externally formed teeth 194. Driving cone 192 is disposed within or inboard of housing 162 and it is mounted on one end of a relatively small shaft 196. Shaft 196 is rotatably mounted in a bushing assembly 200. The other end of shaft 196 extends through bushing 200 and it is disposed outboard of housing 162. This last-mentioned end of shaft 196 carries a folding handle 198. The shaft is mounted in assembly 200 in such manner as to place the pivot axis of driving means 192 orthogonal to the pivot or central longitudinal axis of loading disc 180. A pair of bolts 202 mount bushing assembly 200 in the side of housing 162 as shown. The disposition of driving means 192 in relation to the external teeth of conical disc 180 is such as to cause the associated gear teeth of conical disc 180 and means 192 to mesh along a common interface region seen best in FIG. 15.

In operation and to place a controlled and preset drag on barrel 44, handle 198 is appropriately rotated. Rotative movement of handle 198 simultaneously pivots shaft 196 causing rotative displacement of geared or toothed cone 192. Rotative movement of cone or means 192 drives and rotates conical loading disc 180 owing to the fact that exposed gears 182 and 194 of respective conical members 180 and 192 are in meshing engagement. Because conical loading disc 180 is threadably mounted on external threads 178b, appropriately directed rotative movement of disc 180 displaces same on sleeve 178 in such manner as to drive interface or friction platform 180a against the confronting face of barrel 44. The other face of barrel 44 is then driven firmly against the confronting planar surface of partition 166 to react thereon. The compression of barrel 44 between interface platform 180a on the one side, and the opposed planar face of partition 166 on the other side, produces a frictional drag on the barrel and thus a frictional drag on lever 170. It will be apparent that the amount of drag is controlled precisely by operation or rotation of driving means 192.

For purposes of clarity, the Bowden cable system used to shift gears and operating to couple lever 170 to the vehicle transmission is not shown. The mechanical construction and manner of operation of this system is described fully above. Suffice it to say, however, that movement of the shift cable in, and relative to, the cable sheath is controlled by rotative displacement of barrel 44 that, in turn, is controlled by operation of paddle 174. When a gear shift is desired the rider manually pivots paddle 174. Rotative displacement of paddle 174 operates in conjunction with lever 170 to provide the mechanical advantage necessary to overcome the controlled drag placed on shift barrel 44. Appropriately directed rotation of shift lever 170 and hence barrel 44 produces a lengthening or shortening of the shift cable relative to the cable sheath. The loading placed on the shift barrel by operation of driving means 192 is made sufficient to hold the barrel stationary and thereby prevent the vehicle transmission from moving out of gear. Once the amount of drag is set properly it will not, normally, have to be readjusted. In time and as the need arises, loading compensations can be made on shift barrel 44 by appropriate rotative displacement of driving means 192.

Figure 17:
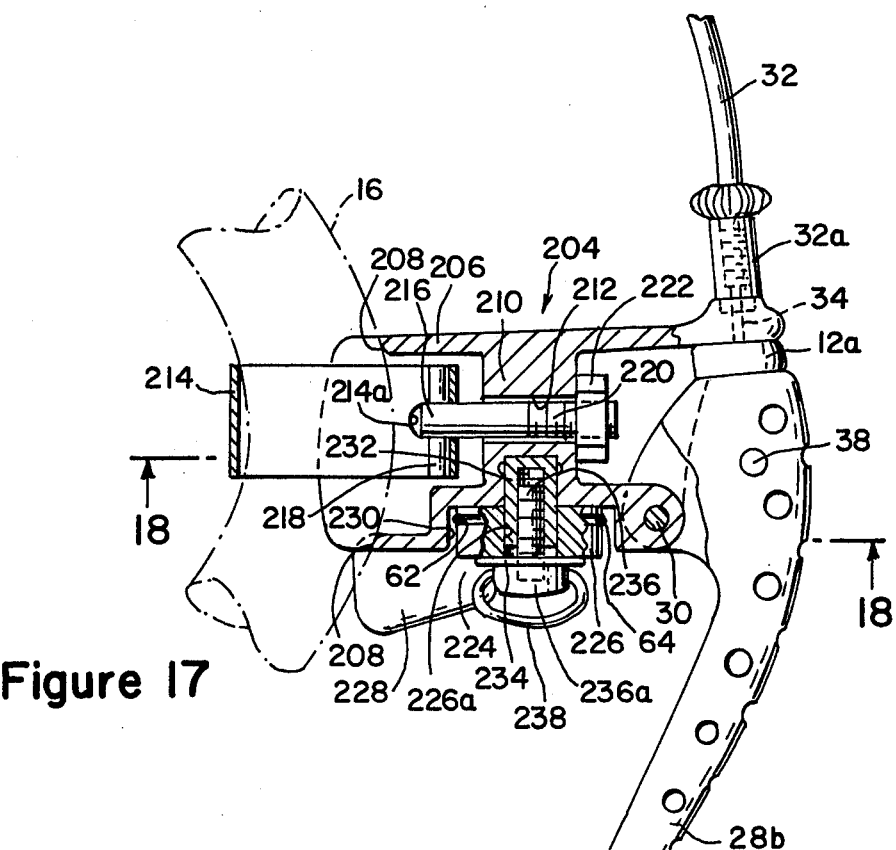
FIG. 17 is a plan view of still another embodiment of the present invention, parts of which are shown in section with the integrated assembly seen mounted on the handlebar.
Figure 18:
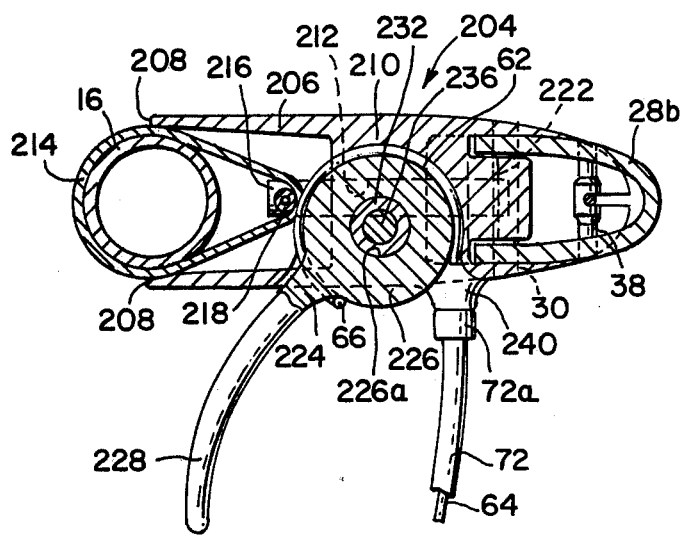
FIG. 18 is a sectional view taken substantially along line 18—18 of FIG. 17 with some parts in elevation for clarity.

Referring now to FIGS. 17 and 18 there is shown still another embodiment of the present invention. The shift apparatus and integrated handbrake assembly is indicated generally by reference numeral 204 and it is shown attached to handlebar 16. Assembly 204 is comprised of a handbrake support or housing 206 the outboard end of which carries a handbrake lever 28b and attendent structure. Lever 28b and associated structure is substantially similar to that described with reference to the handbrake levers seen in FIGS. 1 through 14 so it need not be further discussed here.

The inboard portion of bracket 206 is formed with a handlebar seat 208 adapted to fit onto a portion of handlebar 16 when the assembly is caused to mount thereon. Housing 206 is formed with a support partition or wall 210 through which is drilled an aperture 212. A mounting strap 214 is formed as an endless loop and it has an opening 214a. The strap is received around handlebar 16 as shown. A mounting bolt 216 has one end adapted to receive, or it is integrally formed with, a toggle piece 218. The other end of bolt 216 is formed with threads 220. Toggle piece 218 is directed against the inboard face of strap 214. Bolt 216 is directed to extend through strap opening 214a to be received in aperture 212 as shown. A nut 222 is threaded onto those bolt threads 220 that extend out of aperture 212 and clear of partition wall 210. It then will be apparent that tightening nut 222 tensions bolt 216 causing same to react against strap 214. As strap 214 is tensioned and pulled taut, it draws seat 208 firmly onto handlebar 16.

A shift lever 224 has one end thereof formed as a shift barrel 226. Shift barrel 226 is defined by two planar faces and a centrally disposed mounting aperture 226a communicating between these two faces. The other end of shift lever 224 flares to form a shift paddle 228. One side of housing 206 is formed with a barrel socket 230. An internally threaded sleeve 232 is press-fit centrally into socket 230 with a portion of the former extending into the space included by the latter. In the embodiment shown it is preferred that the socket be oriented so as to place sleeve 232 orthogonal to the pivot axis or pin 30 of lever 28b. The outside diameter of sleeve 232 is sized complementary to the inside diameter of barrel-mounting aperture 226a. Shift barrel 226 is mounted in socket 230 by placing barrel aperture 226a onto the exposed portion of sleeve 232. It will be observed that that length of sleeve 232 which projects into socket 230 is less than the thickness or width of barrel 226. It is preferable to place a pivot washer 234 on the outboard face of barrel 226. A threaded stud 236 has one end formed with a cap 236a. Cap 236a carries a folding handle 238 as shown. Stud 236 is threaded into the internal threads of sleeve 232 causing pivot washer 234 to abut against the outboard face of shift barrel 226.

As in earlier mentioned embodiments, one end of a Bowden shift cable 64 wraps partways around barrel rim groove 62 to be keyed thereto by a key 66. A cable guide or portal 240 is appropriately aligned with respect to rim groove 62 so as to receive and guide shift cable 64 as the cable proceeds off rim groove 62. A cable jacket 72 is attached to portal 240. The jacket is connected to portal 240 and hence housing 206 by means of jacket cap 72a.

In operation, and to apply a controlled drag on shift barrel 226, handle 238 is appropriately turned. As handle 238 is turned, it threadably tightens bolt 236 into sleeve 232. This drives pivot washer 234 against the outboard face of barrel 226. Under influence of bolt cap 236a the pivot washer drives barrel 226 against the planar face of socket 230. The pivot washer and socket wall react against their respective confronting faces of shift barrel 226 to provide a controlled loading on the barrel. This barrel loading is set precisely by operation or turning of stud 236. The drag on the shift barrel is maintained at a level which prevents unwanted or free-wheeling movement of shift lever 224. To effect the desired gear change, the rider manually pivots lever handle 228. The handle and integral shift lever 224 operate to provide the mechanical advantage necessary to overcome the aforementioned drag and thereby causes the shift barrel to pivot. As noted earlier, the pivot axis of shift lever 224 is perpendicular to the pivot axis of brake lever 28b. Because the former mentioned lever is closely positioned to the latter mentioned one, nearly simultaneous grip of both levers is possible.

While stud 236 and cap 236a are shown as integrally formed, other constructions are possible. One such other construction might press-fit stud 236 into sleeve 232. Cap 236a is then supplied as a discrete element to be threaded onto the exposed end of the stud thereby to load the shift barrel substantially as aforesaid.

Figure 19:
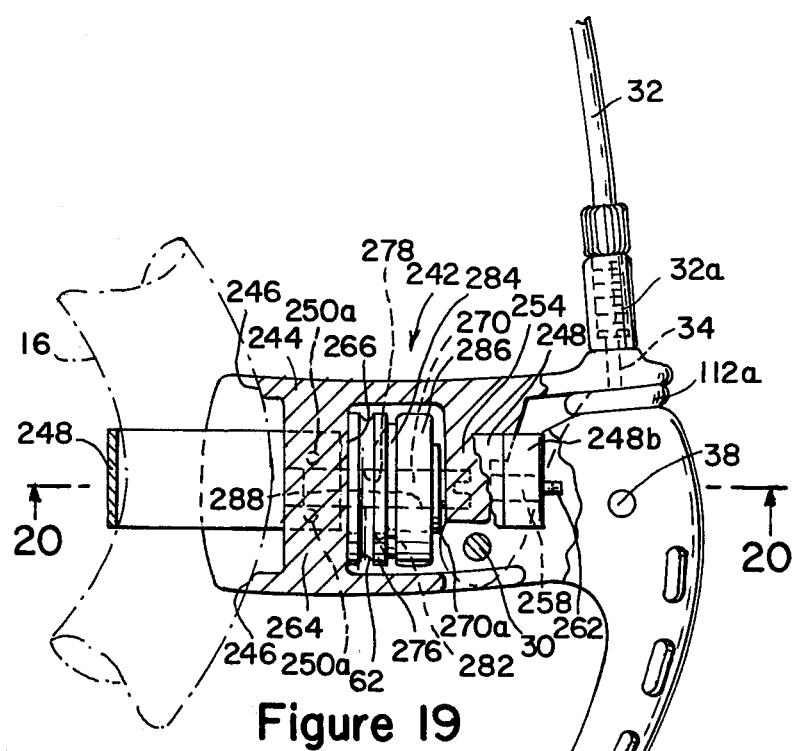
FIG. 19 is a plan view of one more embodiment of the present invention, parts of which are shown in section with the apparatus seen strapped to the handlebar; and, FIG. 20 is a view taken substantially along line 20—20 of FIG. 19 with some parts in elevation for clarity.
Figure 20:
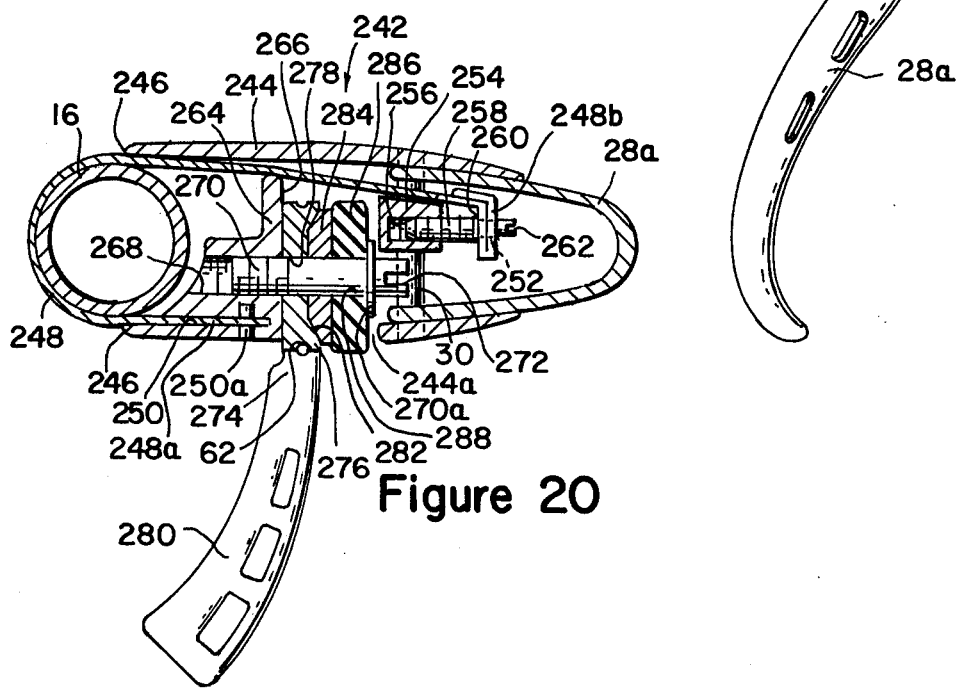

In FIGS. 19 and 20 there is shown one more embodiment of the present invention. The shift apparatus and integral handbrake assembly is indicated generally by reference numeral 242 and it is shown attached to a handlebar 16. Apparatus 242 is comprised of a handbrake support bracket 244 the outboard end of which carries handbrake lever 28a and attendent structure as described fully in earlier mentioned embodiments.

The inboard portion of bracket 244 is defined by a handlebar seat 246 that demountably attaches to handlebar 16. As seen best in FIG. 20, housing 244 is formed with a strap-receiving slot 250. A strap 248 is formed with an end 248a adapted to fit into slot 250. Strap end 248a is locked in slot 250 by means of rivets 250a as shown. The other end of strap 248 folds back upon itself to form a reinforced end 248b through which is formed an aperture 252. Housing 244 is constructed with a shelf 254 into which is drilled a tapped aperture 256. A tensioning bolt 258 has one end formed with a discontinuity of cross-section thereby to define a shoulder 260 of larger cross-section than strap aperture 252. A slot 262 is placed on the outboard end of bolt 258. To amount apparatus 242 on handlebar 16, strap end 248b is wrapped part-ways around the handlebar and placed in interior of housing 244. Bolt 258 is threaded into shelf aperture 256. Aperture 252 of reinforced strap end 248b is received on the aforementioned slotted end of bolt 258 in such manner as to cause strap end 248b to abut against shoulder 260. By means of slot 262 bolt 258 is turned. This causes bolt 258 to thread out or move relative to tapped aperture 256. Movement of bolt 258 out of, an relative to, shelf 254 tensions strap 248. As the strap is tensioned it draws seat 246 securely against handlebar 16, mounting housing 244 firmly thereon.

Housing 244 is formed with a support partition 264. The support partition is formed with a planar face 266. A lever window or slot 244a is suitably aligned with respect to planar face 266 and placed contiguous thereto. Partition 264 is fabricated with a tapped aperture 268 into which threads a stud 270. One end of stud 270 is formed with a cap 270a on which is placed an integrally formed slot 272.

The shift apparatus is comprised of a shift lever 274 one end of which is formed with a shift barrel 276. The shift barrel contains a through-aperture 278 about which the shift barrel pivots when mounted as will be described shortly. The rim of shift barrel 276 is formed with a rim groove 62. The other end of lever 274 flares to form a flattened finger paddle or handle 280 in a manner not unlike earlier described shift levers. It is preferable to make one face of shift barrel 276 flat. The other face of barrel 276 is formed with a conical depression or seat 282. Means for placing a controlled drag on shift barrel 276 includes a pivot washer 284 one side of which is sized complementary to the conical or truncated depression the shift barrel. A biasing element 286 is configured so as generally to cover pivot washer 284. Preferably, biasing element 286 is comprised of a resilient material such as a hard rubber or nylon. Biasing element 286 is formed with a central aperture 288 that is sized smaller than the area covered by cap 270a. Stud 270 is received in aperture 288 thus carrying element 286 as shown.

Shift barrel 276 is mounted in housing 244 by placing the flat face of barrel 276 against the planar face of partition 266. The conical portion of pivot washer 284 is placed in complementary barrel depression 282. Stud 270 carrying resilient biasing element 286 is threaded into tapped aperture 268 in a manner that places one face of biasing element 286 against the outboard and planar face of pivot washer 284. The other face of biasing element 286 abuts against, and is constrained by, cap 270a. The mounting of barrel 276 against partition 264 is such as to place and suspend a portion of shift lever 274 through window 244a thereby to disposed handle 280 clear of housing 244 albeit depending therefrom.

In operation and to place a controlled drag on the shift barrel, stud 270 is threaded and tightened into tapped aperture 268. This action causes cap 270a to react on and compress biasing element 286, driving same against the confronting face of pivot washer 284. Pivot washer 284, in turn, drives barrel 276 against partition planar face 266. The reaction of partition planar face 266 on one side of the shift barrel in combination with the compressive action of pivot washer 284 on the other side of the shift barrel places a frictional drag on the barrel. It will be apparent that the amount of drag or loading on shift barrel 276 is controlled precisely by the tensioning or turning of stud 270. For purposes of clarity, the Bowden cable system that is coupled to the vehicle transmission is not shown. However, one end of the Bowden shift cable is attached to lever 274 in a manner similar to earlier described embodiments. To effect a gear change, handle 180 is rotated. Rotative movement of the handle provides the mechanical advantage necessary to overcome the controlled and preset drag operating on shift barrel 276. As the shift barrel rotates in response to finger pressure on handle 280, the Bowden shift cable experiences a relative lengthening or shortening. The drag placed on the shift barrel 276 prevents unwanted or freewheeling displacement of same to ensure that shifting occurs only in response to manual pressure on the finger paddle.

Although the several embodiments of the present invention are shown demountably attached to a bicycle handlebar, the invention is not to be limited to bicycles because other vehicles and machines are contemplated. And, while it is preferred that the several members or elements of the present invention be fabricated of metal except as where otherwise noted, other materials can be used. For example, it may be entirely satisfactory for some of the relatively lower stressed elements to be comprised of a hard plastic or nylon, or fiberglass. Then, too, it is possible to fabricate some of the elements as composites. In accordance with such a composite structure and as an illustration only, the complementary conical interface region of pivot washer 284 might be made of steel to which is bonded a nylon body.

Further still, whereas the drag placed on the shift barrel is shown and described as accomplished by mechanical means, other means are also available. One such other means might be by magnetic interaction. According to this magnetic construction and as an example only, the shift barrel and support partition or shelf on which the barrel mounts might be comprised of magnetically attracting material. The magnetic interaction would then supply the force necessary to load one element against the other thereby to produce the required drag.

While only a few embodiments of the present invention have been shown and described, it is to be understood that many changes and modifications can be made hereto without departing from the spirit and scope hereof.

What is claimed is:

1. A shift apparatus and integral handbrake assembly adapted to mount on a handlebar comprising handbrake bracket means on which pivots a handbrake lever, a pivotal shift lever integrally carried by said handbrake bracket, said shift lever having one end formed as a shift barrel and the other end formed as a finger paddle, said handbrake bracket being formed with a slot and having an interior region formed with partition means on which said shift barrel pivotally mounts, the last-mentioned mounting being such that a portion of said shift lever is disposed through said slot thereby to place said handle extending from said handbrake bracket, means for coupling said shift lever to a Bowden cable, and means for placing a controlled drag on said shift barrel whereby pivoting said finger paddle operates to provide the mechanical advantage necessary to overcome the drag placed on said shift barrel and thereby effect a relative lengthening or shortening of the Bowden cable.

2. The shift apparatus of claim 1, means for demountably attaching said handbrake bracket to the handlebar.

3. A shift apparatus and integral handbrake assembly particularly for bicycles comprising handbrake housing means on which pivots a handbrake lever, means for demountably attaching said housing means to the bicycle handlebar, pivotal shift lever means integrally carried by said housing means, means coupling said shift lever to a Bowden cable, said shift lever having one end formed as a shift barrel and the other end formed as a handle, the interior of said housing means being formed with a support partition on which pivotally mounts said shift barrel, a slot formed in said housing means and operatively placed adjacent to said support partition, the mounting of said shift barrel being such that a portion of said shift lever is disposed in said housing slot thereby to place said handle out of and extending from said housing means, and friction means adapted to place a preset and controlled drag on said shift barrel to hold same stationary until finger pressure on said handle operates to overcome the drag placed on said shift barrel and cause movement of the Bowden cable relative to a Bowden cable jacket.

4. The shift apparatus of claim 3, said demountable attachment means including a seat formed on said housing means into which mounts a peripheral portion of the handlebar, and tension means including strap means, said strap means adapted to wrap about the handlebar, said tension means reacting on said housing means and operating to tension said strap means thereby to urge said seat into firm engagement on the handlebar.

5. The shift apparatus of claim 3, said friction means including a domed compression washer reacting on said shift barrel in such manner as to place the controlled drag thereon.

6. The shift apparatus of claim 5, said friction means including an aperture formed in said compression washer, an aperture formed in said shift barrel, and stud means adapted to be received in the respective apertures of said compression washer and shift barrel, said stud means being threadably received in said support partition in such manner as to transfix said compression washer and shift barrel on said stud means, said stud means adapted to drive said compression washer against said shift barrel whereby said shift barrel is pressed against said support partition thereby to place the drag on said shift barrel.

7. The shift apparatus of claim 6, said support partition being defined by a substantially planar face against which said shift barrel mounts.

8. The shift apparatus of claim 7, the substantially planar face of said support partition being disposed in confronting alignment with the handbrake therebetween to place said shift barrel.

9. An integral shift lever and handbrake assembly including in combination a handbrake housing, said handbrake housing having an interior region formed with a support partition, a shift lever integral with said housing and having one end formed as a shift disc and the other end formed as a finger paddle, a slot defined in said handbrake housing, said shift disc being pivotaly carried by said support partition in such manner as to place a portion of said shift lever in said slot thereby to place said finger paddle extending from said handbrake housing, means for placing a controlled drag on said shift disc, and means for coupling a Bowden cable to said shift lever such that manual pressure on said finger paddle operates to provide the mechanical advantage necessary to overcome the drag placed on said shift disc pivoting same and thereby causing a relative lengthening or shortening of the Bowden cable.

10. The assembly of claim 9, said Bowden cable coupling means adapted to couple the Bowden cable to said shift disc.

11. The assembly of claim 9, means for coupling said handbrake housing to a handlebar.

12. An integral shift lever and handbrake assembly particularly for bicycles including a handbrake housing on which pivots a handbrake lever, said handbrake housing having an interior region formed with a support partition, a slot formed on said handbrake housing and communicating with said interior region, said slot being operatively placed adjacent to said support partition, a shift lever having one end defined by a shift barrel and the other end defined by a finger paddle, said shift barrel adapted to pivotally mount on said support partition so as to be substantially included in said handbrake housing, the pivotal mounting of said shift barrel being such as to place a portion of said shift lever in said slot thereby to orient said finger paddle extending from said handbrake housing, means for coupling a Bowden cable to said shift lever, means for mounting said handbrake housing on the bicycle handlebar, and means for placing a controlled frictional drag on said shift barrel such that manual pressure on said finger paddle overcomes the drag placed on said shift barrel pivoting same and causing a relative lengthening or shortening of the Bowden cable.

* * * * *

UNITED STATES PATENT AND TRADEMARK OFFICE
CERTIFICATE OF CORRECTION

PATENT NO. : 4,100,820
DATED : July 18, 1978
INVENTOR(S) : Joel Evett

It is certified that error appears in the above-identified patent and that said Letters Patent are hereby corrected as shown below:

On the Title Page above the Abstract add the following:

*Attorney, Agent, or Firm*—Howard Alan Taishoff

In the Specification:

Col. 4, line 13, "free" should read -- face --.
    Col. 9, line 24, "driving cone" should read -- driving-cone --.
    Col. 9, line 25, "Driving cone" should read -- Driving-cone --.
    Col. 11, line 64, "amount" should read -- mount --.
    Col. 12, line 30, after "depression" insert -- in --.
    Col. 13, line 15, after "metal" insert -- , --.

Signed and Sealed this

Thirteenth Day of February 1979

[SEAL]

Attest:

RUTH C. MASON
*Attesting Officer*

DONALD W. BANNER
*Commissioner of Patents and Trademarks*